Dec. 27, 1966     R. P. MASSEY     3,295,043
D.C. TO D.C. REGULATED CONVERTER
Original Filed March 5, 1963
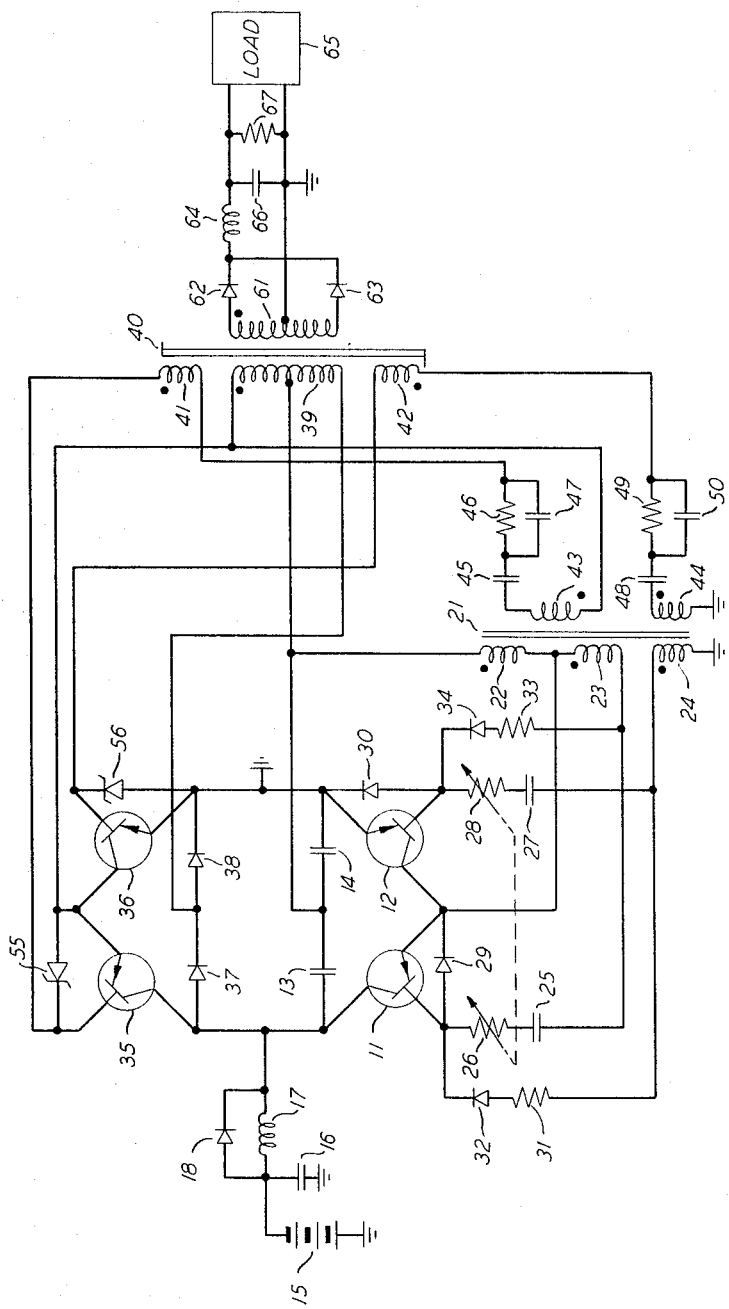
INVENTOR
*R. P. MASSEY*
BY
*R. B. Andis*
ATTORNEY

United States Patent Office 3,295,043
Patented Dec. 27, 1966

3,295,043
D.C. TO D.C. REGULATED CONVERTER
Richard P. Massey, Westfield, N.J., assignor to Bell Telephone Laboratories, Incorporated, New York, N.Y., a corporation of New York
Continuation of application Ser. No. 263,062, Mar. 5, 1963. This application Feb. 15, 1966, Ser. No. 537,591
3 Claims. (Cl. 321—2)

This application is a continuation of application Serial No. 263,062, which was filed March 5, 1963, now abandoned.

The invention relates generally to electrical current supply circuits and more particularly to electrical current supply circuits which are regulated to maintain substantially constant output voltage.

The usual voltage regulator operates with a closed feedback loop. An error detector compares the output or load voltage with a standard reference voltage and feeds any discrepancy back to a regulating device which is located between the input voltage source and the error detector. The regulating device is normally a variable impedance device or a switch and is connected either in series with or in shunt across the input voltage source. Such regulators are versatile in that they correct not only for changes in input voltage but also for load impedance variations, but tend to be relatively complex and can be somewhat wasteful of power. Because they normally provide no D.C. isolation between input source and load, such regulators can also be troubled by unwanted ground loops and a resulting instability and shock hazard.

One object of the present invention is to increase the efficiency of voltage regulation in an electrical current supply circuit in as simple a manner as possible.

Another object is to increase the efficiency of voltage regulation and, at the same time, provide effective D.C. isolation between the input and output circuits of the regulator.

The invention takes advantage of the fact that there are frequent occasions when a voltage regulator need correct only for changes in input voltage and makes use of a so-called D.C. to D.C. converter to provide regulation on an open-loop basis. While the resulting regulator does not compensate for changes in load impedance, it has increased efficiency, greater simplicity, and provides complete D.C. isolation between input and output circuits.

In the electrical current supply art, a converter is a circuit for transforming a direct current at one voltage level to another direct current at a different voltage level and is normally made up of an inverter for changing the direct input current to an alternating current, a transformer (which may be the output or feedback transformer of the inverter) for changing the voltage level of the alternating current, and an output rectifier. Such circuits are generally quite simple, waste very little power, and provide good D.C. isolation between input and output circuits. They provide no regulation, however, since changes in input voltage result in corresponding changes in output or load voltage.

In accordance with the invention, a D.C. to D.C. converter is made to function as an open-loop regulator by providing the output or feedback transformer of its inverter with a saturable core having a substantially rectangular hysteresis loop and driving the inverter in such a manner as to maintain its operating frequency substantially constant. The saturable transformer core maintains the volt-time product of the A.C. wave generated by the inverter substantially constant, making the magnitude of the output voltage derived therefrom substantially independent of variations in input voltage magnitude. The open-loop regulator retains, of course, all of the usual advantages of a D.C. to D.C. converter in that it is relatively simple, wastes very little power, and provides good D.C. isolation. It can be used, moreover, to provide either a step-up or a step-down in voltage. Because there is no closed regulating feedback loop, any likelihood of unwanted ground loops, with the attendant chance of shock hazard or instability, is eliminated.

In a preferred embodiment of the invention, the inverter (called the power inverter for reference convenience) of the D.C. to D.C. converter is driven at a constant frequency by another inverter. The driving inverter is powered from the same input voltage source as the power inverter but has its operating frequency specially stabilized against variations in input voltage magnitude. The constant-frequency operation of the power inverter permits the saturable core of its output or feedback transformer to perform the regulating function by maintaining a constant volt-time product in the manner described.

A more complete understanding of the invention may be obtained from a study of the following detailed description of the specific embodiment illustrated in the drawing.

In the illustrated embodiment of the invention, the power inverter is driven at a constant frequency fixed by an auxiliary inverter powered from the same input voltage source but stabilized in frequency against changes in input voltage magnitude in the manner disclosed and claimed in applicant's United States Patent 3,215,952, which issued November 2, 1965.

The frequency-stabilized driving inverter is in the form of a four-terminal bridge circuit in which a pair of p–n–p transistors 11 and 12 form one pair of adjacent arms and a pair of voltage-dividing capacitors 13 and 14 the other. As illustrated, the emitter-collector paths of transistors 11 and 12 are connected in series with one another, with the emitter of transistor 11 and the collector of transistor 12 forming one of the four terminals of the bridge. To apply a direct input voltage across one diagonal of the bridge, the terminal formed by capacitor 14 and the emitter of transistor 12 is grounded and the one formed by capacitor 13 and the collector of transistor 11 is connected to the negative side of an input D.C. source 15 through a smoothing filter consisting of a shunt capacitor 16 and a series inductor 17. In addition, a germanium diode 18 is connected across inductor 17 to eliminate any voltage transients created by turning the converter on and off. The output of the frequency-stabilized inverter is taken from a transformer 21, one winding 22 of which is connected from the bridge terminal between capacitors 13 and 14 to that formed by the emitter of transistor 11 and the collector of transistor 12.

Regenerative feedback is provided in the driving inverter by two additional windings 23 and 24 of transformer 21. The relative polarities of the windings are as indicated by the dots. One end of winding 23 is connected to the emitter of transistor 11, while the other is connected through a timing capacitor 25 and a timing resistor 26 to the base of transistor 11. One end of winding 24, on the other hand, is grounded (as is the emitter of transistor 12) while the other is connected through a timing capacitor 27 and a timing resistor 28 to the base of transistor 12. Timing resistors 26 and 28 are variable and ganged, as illustrated, to provide fine control of the driving inverter operating frequency. Finally, a diode 29 is connected between the base and emitter electrodes of transistor 11 and poled toward the latter electrode, while a diode 30 is similarly connected and poled between the base and emitter electrodes of transistor 12.

In operation, transistors 11 and 12 of the driving inverter conduct alternately. The voltage division between capacitors 13 and 14 is substantially equal. When transistor 12 is conducting (in saturation), half of the input voltage is applied to winding 22 and induces voltages on the other windings of transformer 21. The voltage on winding 22 is negative at the dot, as are those on windings 23 and 24. The negative potential applied to timing capacitor 27 by winding 24 holds transistor 12 in its conducting state, while the positive potential applied to capacitor 25 by winding 23 and developed across diode 29 holds transistor 11 in its non-conducting state. As capacitor 27 charges, the base current of transistor 12 decreases exponentially. When it reaches the value $I_c/\beta$ $I_c$ is the collector current flowing in the transistor and $\beta$ is the transistor common-emitter current gain, transistor 12 comes out of saturation and the voltage across its emitter-collector path increases. At the same time, the reverse bias on transistor 11 decreases as capacitor 25 charges. By regenerative action, transistor 11 switches to its conducting (saturated) state and transistor 12 switches to its non-conducting state. The voltage across winding 22 of transformer 21 reverses and the induced voltages across all of the windings of the transformer 21 also reverse. The cycle repeats itself, maintaining oscillation, with the frequency determined primarily by the time constant of capacitor 25 and resistor 26 and by the time constant of capacitor 27 and resistor 28.

The frequency of the driving inverter is stabilized against input voltage variations by a pair of diode-resistor networks connected to inject into the base of each transistor when conducting a reverse current at least equal to the maximum $I_{co}$ for that transistor, where $I_{co}$ is the transistor collector current which still flows in the absence of emitter current. One of these networks, made up of the serial combination of a current-limiting resistor 31 and a diode 32, is connected from the end of transformer winding 24 indicated by the dot to the base of transistor 11. The other, consisting of the serial combination of a current-limiting resistor 33 and a diode 34, is connected from the end of winding 23 remote from the dot to the base of transistor 12. Diodes 32 and 34 are both poled toward the base electrodes of their respective transistors and resistors 31 and 33 both cooperate with their respective transformer windings to fix the injected currents at at least the maximum values of $I_{co}$ for their respective transistors. The injected currents are preferably limited to values only slightly in excess of the maximum values of $I_{co}$ for the transistors in order to provide complete frequency stability without unnecessary loss of power.

In accordance with an important feature of the invention, the frequency-stabilized inverter which has just been described is employed to drive the main or power inverter of a D.C. to D.C. converter. The output or feedback transformer of the power inverter is, in accordance with another important feature of the invention, provided with a saturable core having a substantially rectangular hysteresis loop. The power inverter in the illustrated embodiment of the invention is without independent frequency stabilization, but is of the same general type as a driving inverter. It takes the form of another four-terminal bridge circuit in which a pair of p-n-p transistors 35 and 36 form one pair of adjacent arms and voltage-dividing capacitors 13 and 14 form the other. A pair of diodes 37 and 38 are connected in series with one another across capacitors 13 and 14 to assist in maintaining exact voltage division across the capacitor voltage divider. As illustrated, diodes 37 and 38 are poled from D.C. source 15 toward ground so that they are biased in the reverse direction.

The output from the power inverter is taken from the bridge diagonal between the terminal formed by the respective emitter and collector electrodes of transistors 35 and 36 and the terminal formed between capacitors 13 and 14. Half of a center-tapped winding 39 of an output transformer 40 is connected across that diagonal.

The other half of winding 39 is connected, as illustrated, from the junction of capacitors 13 and 14 to the junction between diodes 37 and 38. Exact voltage division across the capacitor voltage divider is obtained through the use of this portion of winding 39 in conjunction with diodes 37 and 38. If the voltage across capacitor 14 tends to rise while transistor 36 is conducting, due to an unbalance in the capacities of the two capacitors, the voltage across the upper portion of winding 39 also tends to rise. The voltage across the lower portion of the winding rises at the same time. Since the resulting voltage across the lower portion of winding 39 is greater than the voltage across capacitor 13, the ensuing current through diode 37 charges capacitor 13 and restores equal voltage division. Similarly, if the voltage across capacitor 13 tends to exceed that across capacitor 14, diode 38 conducts and restores equal voltage division.

Regenerative feedback in the power inverter is provided by a pair of feedback windings 41 and 42 of transformer 40. As illustrated, winding 41 is connected to the base of transistor 35, while winding 42 is connected to that of transistor 36. To provide accurate control of the frequency of the power inverter, output transformer 21 of the driving inverter, which is stabilized in frequency against variations in input voltage magnitude, is equipped with a pair of output windings 43 and 44. One end of winding 43 is connected through a capacitor 45 and a current-limiting resistor 46 to the end of winding 41 remote from transistor 35. Resistor 46 is shunted by a capacitor 47. The other end of winding 43 is connected to the bridge terminal formed by the junction between the emitter of transistor 35 and the collector of transistor 36. One end of winding 44, on the other hand, is connected through a capacitor 48 and a current-limiting resistor 49 to the end of winding 42 remote from transistor 36. Resistor 49 is shunted by a capacitor 50. The other end of winding 44 is grounded. The relative polarities of all of the windings of transformers 21 and 40 are as indicated by the dots. Finally, a first Zener diode 55 is connected between the emitter and base electrodes of transistor 35 and poled in the forward direction toward the base, while a second Zener diode 56 is similarly connected and poled between the emitter and base electrodes of transistor 36.

The power inverter in the illustrated embodiment of the invention operates in both frequency and phase synchronism with the driving inverter. Transistors 11 and 35 conduct in phase with one another, as do transistors 12 and 36. When transistors 12 and 36 are conducting, the voltages across windings 43 and 44 of transformer 21 are negative at the dots and series additive with those across windings 41 and 42 of transformer 40. The combined voltage across windings 42 and 44 forward biases Zener diode 56 and the base-emitter junction of transistor 36, driving transistor 36 into full conduction. This base driving current, the bulk of which flows through transistor 36 rather than through diode 56, is limited by resistor 49 and charges capacitors 48 and 50. At the same time, the combined voltage across windings 41 and 43 breaks down Zener diode 55 in the reverse direction, charging capacitors 45 and 47 through current-limiting resistor 46. Since Zener diode 55 is in breakdown, it provides a reverse cut-off voltage for transistor 35 and holds it in its non-conducting state.

As has already been indicated, the core of transformer 40 is of the rectangular hysteresis loop variety. For this reason, it saturates before the base currents in the driving inverter transistors decrease to the switching point. When the core of transformer 40 saturates, there is no further change in flux and all winding voltages fall to zero. The difference between the voltage across capacitor 48 and that across winding 44 of transformer 21 is positive and small enough not to break down Zener diode 56. Also, the sum of the voltage across capacitor 45 and that across winding 43 of transformer 21 is positive and small enough not to break down Zener diode 55. Since Zener diodes 55 and 56 are reverse biased, they are effective open circuits, causing both transistors 35 and 36 of the power inverter to be non-conducting.

When transistors 11 and 12 of the driving inverter switch so that transistor 11 conducts and transistor 12 is shut off, the voltages across windings 43 and 44 of transformer 21 reverse polarity. The sum of the voltages across capacitors 48 and 50 and the voltage across winding 44 of transformer 21 is positive and high enough to break down Zener diode 56. Transistor 36 is thus held in its non-conducting state. At the same time, the difference between the voltage across capacitor 45 and the voltage across windings 43 of transformer 21 is negative, forward biasing Zener diode 55 and the base-emitter junction of transistor 35. Transistor 35 is thereby driven into conduction. The voltage on the upper portion of winding 39 of transformer 40 then reverses polarity and the cycle repeats. Capacitors 47 and 50 help decrease the turn-off times of power inverter transistors 35 and 36.

The output voltage of the power inverter in the illustrated embodiment of the invention appears at an output winding 61 of saturable transformer 40 as alternate halves of a square wave separated by zero voltage intervals. Full-wave rectification is provided by a pair of diodes 62 and 63, each connected to an opposite end of output winding 61. The rectified voltage is filtered by passing it through a series inductor 64 to the load 65. A shunt capacitor 66 between inductor 64 and load 65 aids in the filtering. A bleeder resistor 67 is shunted across load 65 to limit output voltage in the event of an open-circuited load.

Line voltage regulation without a closed feedback loop in the illustrated embodiment of the invention is achieved by the use of material having a substantially rectangular hysteresis loop for the core of transformer 40. Such a material has a constant volt-time product. For this reason, transformer 40 saturates earlier in the cycle when the voltage applied to the upper portion of winding 39 increases and later when that voltage decreases. Since there is no further change in flux when transformer 40 saturates, all winding voltages fall to zero, switching the conducting one of power inverter transistors 35 and 36 to its non-conducting state. Since the other transistor is not switched to its conducting state until the corresponding transistor in the driving inverter begins to conduct, the over-all period of the output wave appearing on output winding 61 of transformer 40 consists of one conduction interval and one zero voltage interval of transistor 36 followed by one conduction interval and one zero voltage interval of transistor 35. If the input voltage supplied by D.C. source 15 increases, the conduction intervals shorten and the zero voltage intervals lengthen by a corresponding amount. If the input voltage decreases, on the other hand, the conduction intervals lengthen and the zero voltage intervals shorten. Since the over-all period of the power inverter output wave is, in accordance with an important feature of the invention, held constant by the driving inverter even though the input voltage changes, the average value of the rectified output of the power inverter is held constant. The final filtered output voltage appearing across load 65 is thereby made independent of input voltage variations and a regulating effect is achieved without the use of a closed feedback loop.

Because there is no power dissipation in a series or shunt regulating element, the illustrated regulator approaches optimum efficiency. It is extremely simple and, for that reason, rugged and highly reliable. The D.C. to D.C. converter permits either a step-up or a step-down in voltage and the lack of a closed feedback loop permits complete D.C. isolation of the input and output circuits.

The illustrated regulator may, in addition, be operated as a closed-loop regulator in order to achieve closer load voltage regulation than is obtainable from an ordinary closed-loop regulator. A conventional error detector may be used to detect departures of the load voltage from a reference value and the resulting error signal used to vary a resistance placed across an additional winding of transformer 21. Resistance variations are reflected back into the driving inverter and adjust its frequency in such a way as to regulate the load voltage.

It is to be understood that the above-described arrangement is illustrative of the application of the principles of the invention. Numerous other arrangements may be devised by those skilled in the art without departing from the spirit and scope of the invention.

What is claimed is:

1. A regulated converter which comprises a source of direct input voltage, an output rectifier, a separately excited inverter powered by said source connected to supply an alternating voltage to said output rectifier, said separately excited inverter including a pair of transistors, a pair of capacitors, the emitter-collector paths of said transistors being connected in series to form two adjacent arms of a four-terminal bridge and said capacitors being connected in series to form the remaining two arms of the same bridge, and a saturable output transformer having a primary winding connected across the diagonal of said bridge formed by the juncture between said transistors and the juncture between said capacitors, a pair of feedback windings each connected to the base electrode of a respective one of said transistors to render the emitter-collector paths of said transistors alternately conducting and non-conducting in phase opposition to each other, and a secondary winding connected to said output rectifier, said source being connected across the other diagonal of said bridge and said saturable output transformer having a substantially rectangular hysteresis loop and saturating at least once during every half cycle of said alternating voltage, and a substantially constant frequency self-excited inverter powered by said source connected with its output coupled to said feedback windings to drive said separately excited inverter at said substantially constant frequency, whereby said saturable transformer maintains the volt-time product of said alternating voltage substantially constant and the magnitude of the direct voltage derived therefrom by said output rectifier is independent of variations in the magnitude of said direct input voltage.

2. A regulated converter in accordance with claim 1 in which said self-excited inverter includes said pair of capacitors and a second pair of transistors, the emitter-collector path of said second pair of transistors being connected in series to form two adjacent arms of a second four-terminal bridge and said capacitors also forming the remaining arms of said second bridge.

3. A regulated converter in accordance with claim 2 in which means abstracting the output from said self-excited inverter is connected across the diagonal of said second bridge formed by the juncture between said second pair of transistors and the juncture between said capacitors and said source is connected across the other diagonal of said second bridge.

References Cited by the Examiner

UNITED STATES PATENTS

| 2,987,665 | 6/1961 | Thompson | 321—16 |
| 3,219,906 | 11/1965 | Keller et al. | 321—2 |
| 3,219,907 | 11/1965 | Josephson | 321—2 X |

References Cited by the Applicant

UNITED STATES PATENTS

| 3,117,270 | 1/1964 | Tailleur. |

JOHN F. COUCH, *Primary Examiner.*

W. H. BEHA, *Assistant Examiner.*